US006856059B2

(12) United States Patent
Stewart et al.

(10) Patent No.: US 6,856,059 B2
(45) Date of Patent: Feb. 15, 2005

(54) SEALED TURBINE GENERATOR AND METHOD

(75) Inventors: Gary L. Stewart, Monroeville, PA (US); Pradeep Tandon, Scarborough, CA (US); Joseph A. Worden, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 138 days.

(21) Appl. No.: 10/227,803

(22) Filed: Aug. 27, 2002

(65) Prior Publication Data

US 2003/0218402 A1 Nov. 27, 2003

Related U.S. Application Data

(63) Continuation-in-part of application No. 10/151,971, filed on May 22, 2002, now abandoned.

(51) Int. Cl.$^7$ ................................................. H02K 5/00
(52) U.S. Cl. .............................. 310/89; 310/71; 29/596
(58) Field of Search ....................... 310/89, 71; 29/596; 174/151, 152 R

(56) References Cited

U.S. PATENT DOCUMENTS

| 3,829,546 | A | * | 8/1974 | Hubter et al. ................ 264/262 |
|---|---|---|---|---|
| 3,903,441 | A | * | 9/1975 | Towne .......................... 310/71 |
| 4,208,599 | A | | 6/1980 | Armor et al. ................... 60/285 |
| 4,488,072 | A | | 12/1984 | Archbald et al. .............. 310/71 |
| 4,642,498 | A | * | 2/1987 | Archibald et al. ............. 310/71 |
| 4,689,546 | A | | 8/1987 | Stephens et al. .............. 322/99 |
| 4,866,316 | A | * | 9/1989 | Humphries et al. ........... 310/71 |
| 5,382,856 | A | | 1/1995 | Keck et al. .................... 310/71 |
| 5,483,023 | A | | 1/1996 | Barnes .................... 174/152 R |
| 5,557,837 | A | * | 9/1996 | Thiard-Laforet et al. ..... 29/596 |
| 5,581,869 | A | | 12/1996 | Travaly ....................... 29/596 |
| 5,775,601 | A | | 7/1998 | Avant, Jr. et al. ............... 241/4 |
| 6,102,105 | A | | 8/2000 | Moran et al. .................. 165/16 |
| 6,133,658 | A | | 10/2000 | Fisher et al. .................. 310/89 |
| 6,164,521 | A | * | 12/2000 | Mellon ....................... 228/164 |
| 6,221,993 | B1 | * | 4/2001 | Currie et al. .................. 528/23 |
| 6,378,873 | B1 | | 4/2002 | Mayer et al. ................ 277/355 |
| 6,515,232 | B2 | * | 2/2003 | Forster ................... 174/152 R |
| 2001/0010797 | A1 | | 8/2001 | Cheng | |
| 2002/0025250 | A1 | | 2/2002 | Cheng | |

* cited by examiner

*Primary Examiner*—Joseph Waks
(74) *Attorney, Agent, or Firm*—Ernest G. Cusick; Philip D. Freedman

(57) ABSTRACT

A turbine generator with stator windings and a hydrogen pressured stator frame, includes an annular L-shaped collar affixed across a circumference of the stator frame and soldered thereto by a solder joint; a terminal plate anchored to the collar across the circumference of the stator frame and marginally separated from the collar to form a first annulus that contains a first sealant composition that interfaces with the solder bond; and a hardening sealant applied to an upper portion of the solder joint. A high voltage turbine generator is sealed by filling a first annulus formed between an annular L-shaped collar affixed across a circumference of the stator frame and soldered thereto by a solder joint and a terminal plate anchored to the collar across the circumference of the stator frame with a first sealant composition; applying a hardening sealant onto the solder joint; and coextensively covering the first sealant composition and the applied hardening sealant with a second sealant composition.

24 Claims, 3 Drawing Sheets

SEALED TURBINE GENERATOR AND METHOD

This is a continuation-in-part of Application Ser. No. 10/151,971, filed May 22, 2002, now abandoned.

BACKGROUND OF THE INVENTION

The invention relates to a sealed turbine generator and to method to repair a hydrogen cooled generator, particularly to seal bushings at a solder seal between a hydrogen atmosphere on one side of a stator frame terminal plate and air on an opposing side of a high voltage turbine generator.

High voltage turbine generator bushings carry power that is developed in stator windings. The windings are encompassed within a hydrogen pressurized stator frame. The bushings penetrate through the stator frame at the frame terminal plate to the outside. The locations where the bushings pass through the plate are sealed to keep hydrogen from leaking out of the frame.

Hydrogen leaks develop between the bushing flange at the frame terminal plate and the frame wall or at solder seals between the bushing flange and the bushing porcelain wall. The hydrogen leaks create hazardous conditions that can result in explosion on either the outside or the inside of the generator.

Hydrogen leaks require generator shut down for repair. Preferably, the leaks are repaired without bushing replacement. If bushing replacement is required, desirably the leak is temporarily repaired to "buy time" to obtain replacement bushings. The temporary repair should take only a few days to minimize "down time." One temporary repair involves taking the generator off line, degassing the stator frame and sealing the leak with a temporary sealing composition to provide time to plan a major shut down when the bushings can be replaced. In one temporary repair procedure, the annulus seal on the hydrogen side of the bushing penetration is cleaned and layers of sealing materials are applied to the leak area. This procedure effectively seals leaks between the bushing flange and the generator frame. However, this repair is not effective to seal leaks between the bushing flange and the porcelain at the solder seal.

There is a need for a sealed generator and method to seal a spacing between a terminal plate and particularly, there is a need for a sealed generator and method that will effectively seal leaks between the bushing flange and the solder seal of bushing penetrations of a stator frame at the frame terminal plate.

BRIEF DESCRIPTION OF THE INVENTION

The present invention provides a sealed generator structure and a method to seal a generator. In a first embodiment, a turbine generator with stator windings and a hydrogen pressured stator frame, comprises an annular L-shaped collar affixed across a circumference of the stator frame and soldered thereto by a solder joint; a terminal plate anchored to the collar across the circumference of the stator frame and marginally separated from the collar to form a first annulus that contains a first sealant composition that interfaces with the solder joint; and a hardening sealant applied to an upper portion of the solder joint.

Also, the invention provides a hydrogen pressured stator frame of a generator that comprises an annular L-shaped collar affixed across a circumference of the stator frame and soldered thereto by a solder joint; a terminal plate anchored to the collar across the circumference of the stator frame and marginally separated from the collar to form a first annulus that contains a first sealant composition that interfaces with the solder bond; and a hardening sealant applied to an upper portion of the solder joint.

Also, the invention provides a method to seal a leak from a hydrogen pressured stator frame of a high voltage turbine generator comprising filling a first annulus formed between an annular L-shaped collar affixed across a circumference of the stator frame and soldered thereto by a solder joint and a terminal plate anchored to the collar across the circumference of the stator frame with a first sealant composition; applying a hardening sealant onto the solder joint; and coextensively covering the first sealant composition and the applied hardening sealant with a second sealant composition.

DETAILED DESCRIPTION OF THE INVENTION

The invention enhances a sealing composition repair of a leaking stator frame by adding an epoxy sealant layer between the porcelain frame wall and the bushing flange at the solder seal. The invention also includes covering the epoxy sealant layer with additional sealant composition to clog leak paths.

Features of the invention will become apparent from the drawings and following detailed discussion, which by way of example without limitation describe preferred embodiments of the present invention.

Figure 1:
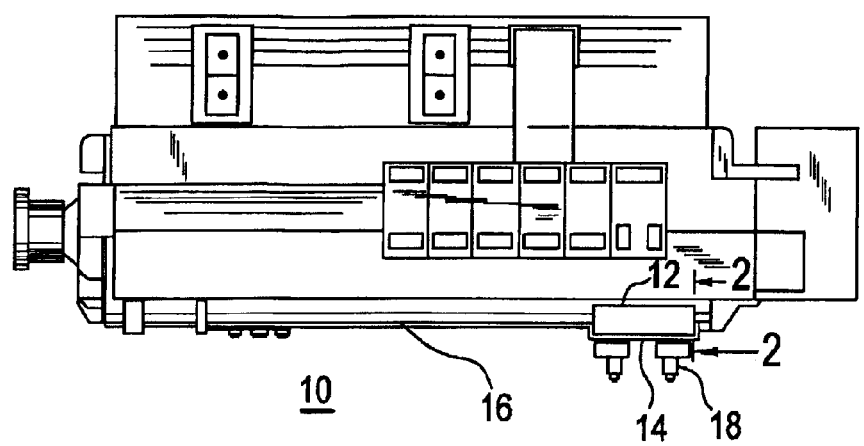
FIG. 1 is a side view of an electric generator.
Figure 2:
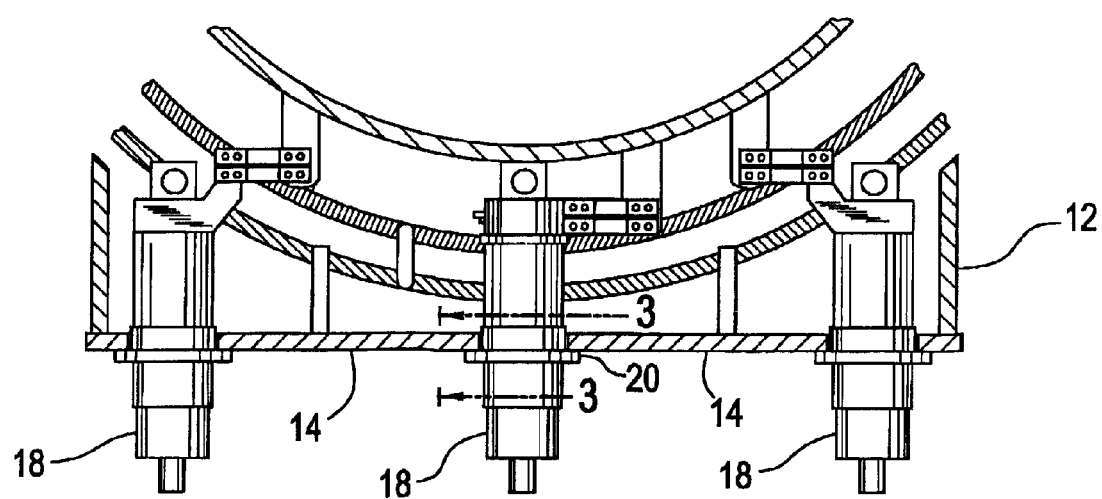
FIG. 2 is a cross section taken along A—A of FIG. 1, illustrating a portion of a terminal plate.

Referring now to FIGS. 1 and 2, a turbine generator 10 is shown with a terminal enclosure 12 having a terminal plate 14 connected to stator frame 16. A plurality of high-voltage bushings 18 connect through the terminal plate 14. High-voltage bushings 18 are sealed to terminal plate 14 as describe with reference to FIG. 3.

Figure 3:
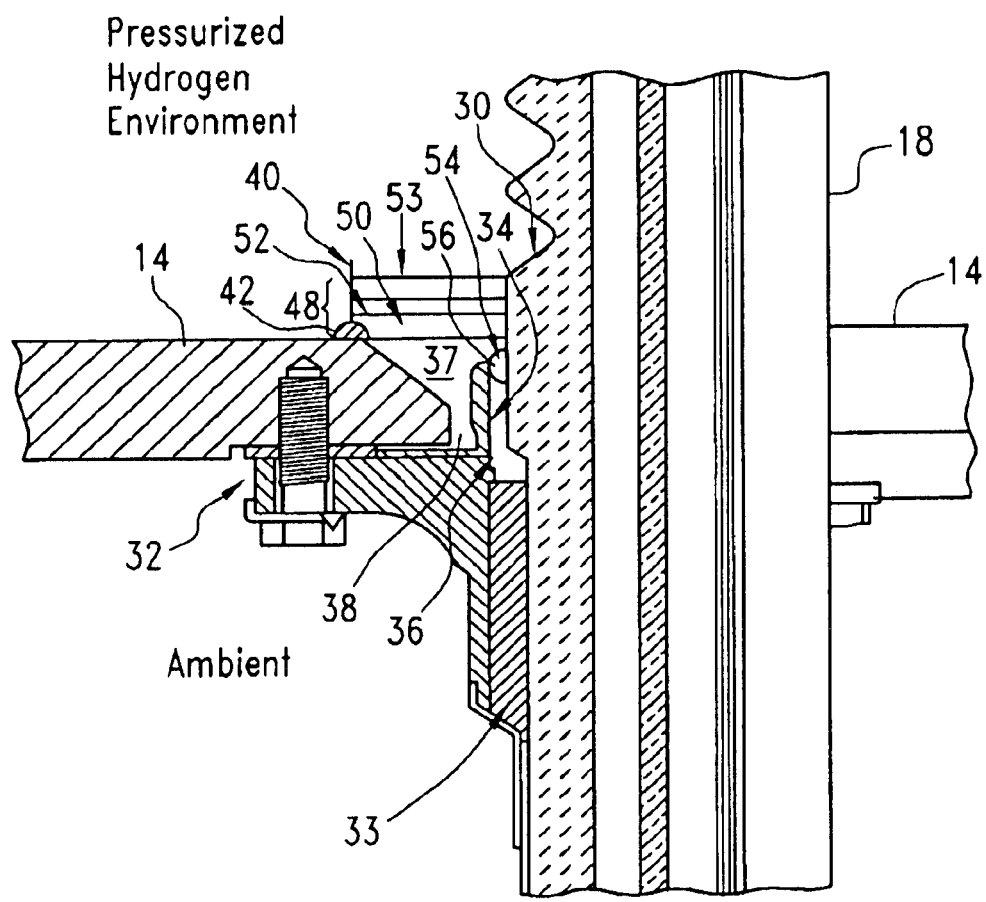
FIG. 3 is a cross section of the intersection of a bushing flange wall with a terminal plate.

FIG. 3 is a cross section of the intersection of a bushing flange wall with a terminal plate. FIG. 3 illustrates a section of a hydrogen pressured stator frame with a compositional leak seal in combination with a ring build up seal. The hydrogen pressured atmosphere and ambient are designated in the FIG. Also shown are stator frame 16 and terminal plate 14 secured to porcelain bushing wall 30 by flange 32 and air side epoxy seal 33. The terminal plate 14 is secured so as to define first annulus 37 with annular L-shaped collar 34 which is secured to the porcelain bushing wall 30 by a solder joint 36. The first annulus 37 is shown filled with a first sealant composition of filler, binder and fluid designated generally as 38.

In the FIG. 3, the filler powder fills a larger space that can be a leak source. Suitable powders include talc, mica dust and fine grit. Mica is group of phyllosilicate minerals with a sheet-like structure. Mica dust is an ultra fine powder as described in Avant Jr. et al., U.S. Pat. No. 5,775,601. A preferred filler powder is a blend of mica dust and short fibers called "Magic Dust," available as material A50A523 from General Electric Company, Schenectady, N.Y., USA.

The binder is a thickening agent such as a silicone grease. Silicone grease is a viscous insulating fluid and sealing material. Other thickening agents include paraffin, acrylic spray and fluorine based grease. The grease can also be a base oil with a thickening agent for example, base silicone oil or mineral oil with a thickening agent, which can be a solid fluorinated polymer powder, polyurea, metallic soap or silica gel. A preferred binder is silica filled silicone grease identified as material D6A11A3, available from General Electric Company, Schenectady, N.Y., USA.

The fluid can be a silicone oil or a mineral oil. Silicone oil includes any fluidic organosilicon oxide polymer having the repeating structural unit —$R_2SiO$—, where R represents a monovalent organic radical, such as methyl or phenyl. As used herein, mineral oil is a mixture of liquid hydrocarbons. A commercially available silicone oil is poly (dimethylsiloxane), which can have viscosity ranging from 5 to 100,000 centipoises, depending on the molecular weight of the polymer. A typical silicone oil that is suitable for use in this invention is commercially available from Aldrich Chemical Company, Catalog No. 14,615-3. This silicone oil has a viscosity of about 48 centipoises, a thermal conductivity of about 1.5 milliwatt/cm/.degree. C., an index of refraction of about 1.404, and a density of about 0.963 kg/L. A preferred fluid is identifiable as "Viscasil™" or catalogue number A50A-264 available from General Electric Company, Schenectady, N.Y., USA. Viscasil™ is a dimethyl polysiloxane silicone fluid, free from blending, water, sediment or petroleum derivatives, characterized by a viscosity at 25° C. of 60,000±5% ctks and a specific gravity at 25° C. of 0.972 to 0.980.

Mineral oil is also known by the names of paraffin oil and liquid petrolatum, which are derived almost exclusively from petroleum. According its density, mineral oil can be categorized as a light oil or as a heavy oil. A typical mineral oil that is suitable for use in this invention is commercially available from Aldrich Chemical Company, Catalog No. 33-076-0. This mineral oil has a viscosity of about 35 centipoises, a thermal conductivity of about 1.3 milliwatt/cm/degree C., an index of refraction of about 1.476 and a density of about 0.862 kg/L.

Figure 4:
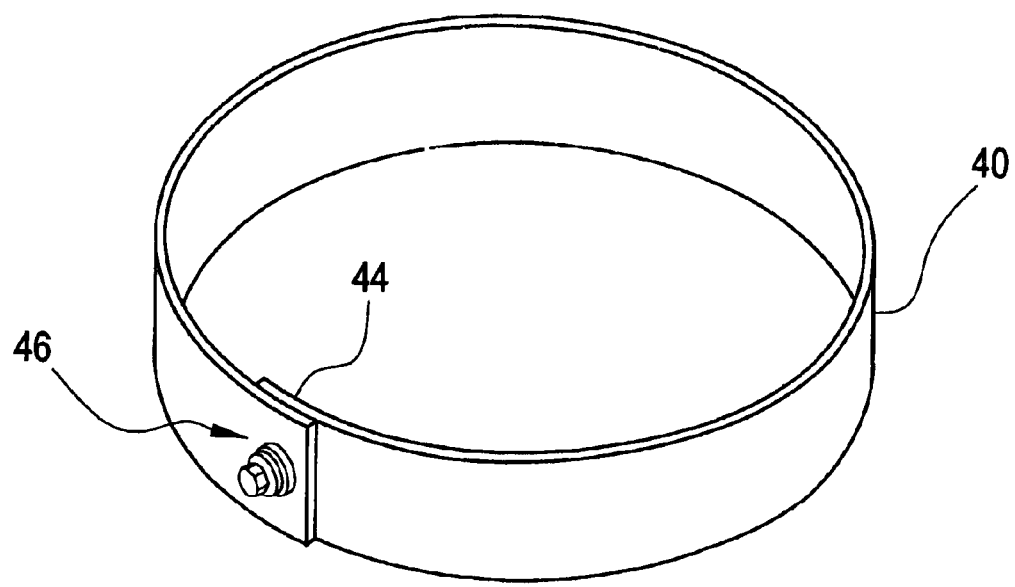
FIG. 4 is a perspective view of a collar to form an annulus.

Further with reference to FIGS. 3 and 4, a ring 40 is provided and secured to terminal plate 14 by a sealant 42. FIG. 4 shows ring 40 in detail. In FIG. 4, the ring 40 is formed from a fiberglass strip that is rolled into a ring shape with overlapping ends 44 and is secured in shape with a plastic bolt 46. The ring 40 forms a second annulus that is shown in FIG. 3 filled with a second sealing composition 48 comprising a filler powder 50, binder 52 and filler fluid 53. Additionally, solder joint 36 is ground out at 54 to form an anchor to accommodate a third sealing composition 56 comprising a hardening sealant. In a preferred embodiment, the solder joint 36 is ground out and the hardening sealant is applied in a first step then both the annulus defined by collar 34 and the annulus defined by ring 40 are filled with the same powder filler/composition binder/fluid filler sealing composition in a single step.

Heat-curable sealants may be used in some embodiments as the hardening sealant to form a hard impervious seal. Moisture-cured sealants or externally-cured materials may be used. Other embodiments may require moisture-cured, externally-cured, air-cured or pressure-sensitive sealants, such as "hot melt" glues. Illustrative hard impervious sealants include those based on acrylic, ethylene such as ethylene vinyl acetate (EVA) copolymer, epoxy materials or combinations of these materials. Commercial examples include the materials commonly referred to as "hot glues."

A preferred epoxy hardening sealant composition comprises an epoxide containing liquid, a hardening agent and filler. While various low viscosity epoxide containing liquids can be used, preferred liquids are selected from diglycidyl ethers of 1,4-butanediol, neopentyl glycol and cyclohexane dimethanol. A suitable epoxide containing liquid comprising the diglycidyl ether of 1,4-butanediol is commercially available from the Shell Chemical Company of Houston, Tex. under the tradename "HELOXY.RTM.67." This epoxide containing liquid has a viscosity at 25° C. in the range of from about 13 to about 18 centipoises, a molecular weight of 202 and a 1 gram equivalent of epoxide per about 120 to about 130 grams of the liquid. A suitable diglycidyl ether of neopentyl glycol is commercially available from Shell Chemical Company under the trade designation "HELOXY.RTM.68." This epoxy containing liquid has a viscosity at 25° C. in the range of from about 13 to about 18 centipoises, a molecular weight of 216 and a 1 gram equivalent of epoxide per about 130 to about 140 grams of the liquid. A suitable diglycidyl ether of cyclohexane dimethanol is commercially available from Shell Chemical Company under the trade designation "HELOXY.RTM.107." This epoxide containing liquid has a viscosity at 25° C. in the range of from about 55 to about 75 centipoises, a molecular weight at 256 and a 1 gram equivalent of epoxide per about 155 to about 165 grams of the liquid.

A variety of hardening agents including amines and carboxylic acid anhydrides can be utilized. The amines can be aliphatic amines, aliphatic tertiary amines, aromatic amines, cycloaliphatic amines, heterocyclic amines, amido amines, polyamides and polyethyl amines. Examples of suitable aliphatic amines are triethylenctetramine, ethylenediamine, N-cocoalkyltrimethylenediamine, isophoronediamine, N-aminoethylpiperazines, imidazoline and 1,2-diaminecyclohexane.

Examples of suitable carboxylic acid anhydrides are methyltetrahydrophathalic anhydride, hexahydrophathalic anhydride, maleic anhydride, polyazelaic polyanhydride and phthalic anhydride. Of the various hardening agents which can be used, triethylenetetramine, N-cocoalkyltrimethylenediamine, isophoronediamine and diethyltoluenediamine are preferred, with isophoronediamine and diethyltoluenediamine being the most preferred. The hardening agent utilized is generally included in the epoxy sealant composition in an amount in the range of from about 15% to about 31% by weight of the epoxide containing liquid in the composition, most preferably about 25%.

The hardening agent is preferably selected from the group of aliphatic amines and acid anhydrides set forth above, with triethylenetetramine, ethylenediamine, N-cocoalkyltrimethylenediamine, isophoronediamine and diethyltoluenediamine being preferred. The most preferred hardening agents are isophoronediamine and diethyltoluenediamine. The hardening agent is included in the epoxy resin composition in an amount in the range of from about 5% to about 45% by weight of the composition, preferably in an amount in of about 30%.

A preferred hardening sealant is available from General Electric Company, Schenectady, N.Y. as material A50A254, which is a solventless, low viscosity penetrating resin, provided in two parts. Part 1 includes an epoxy resin and a reactant solvent and part 2 includes an epoxy hardener. Hardened A50A254 is prepared by mixing a weight ratio of 120 parts of Part 1 to 60 parts of Part 2. Hardened A50A254 has a maximum viscosity at 25° C. of 2000 centipoises, maximum gel time at 100° C. of 30 minutes and a minimum gel time at 65 to 90° F. of 24 hours.

The following Examples are illustrative and should not be construed as a limitation on the scope of the claims unless a limitation is specifically recited.

EXAMPLE 1

The following procedure is conducted to repair leaks between a lower frame extension terminal plate and bushing flange of a high voltage generator. Hydrogen escaping past flange bolt heads and past a gasket between the flange and terminal plate identifies leaks. Approximately 40% of the annulus between the terminal plate and the copper collar surrounding the plate and adjacent the solder joint at the high voltage bushing (HVB) of the generator is filled with three layers of mica dust and fiber ("Magic Dust"). The dust is compacted with a wooden dowel rod after application of each layer. The next 40% of the annulus on top of the mica dust is filled with silicone grease (D6A11A3). The final 20% of the annulus is filled with silicone oil (A50A-264). After application of the silicone oil, the annulus is filled to between ¼ to ½ inch from the level of the terminal plate.

The method provides a field repair of the leaks until a down time can be scheduled for a permanent repair.

EXAMPLE 2

The procedure of EXAMPLE 1 provides a repair of leaks between the lower frame extension terminal plate and the bushing flange but does not repair leaks through the solder joint bonding between the annulus forming copper collar and porcelain bushing wall. These leaks are identified by hydrogen leaking through the epoxy joint between bushing flange and porcelain insulator on the airside of the bushing as shown as 33 in FIG. 3. In the procedure, an approximately ¼ inch deep burr is cut from the top of the solder joint between the copper collar and porcelain wall around the entire circumference of the hydrogen side of the bushing. The burr surface is cleaned with solvent to remove dirt and grease. A hardening epoxy and agent are mixed (A50A254) and applied generously over the cleaned surface. The epoxy is allowed to penetrate through the crack and is then heated to dry with a heat gun.

A fiberglass ring as shown in FIGS. 3 and 4 is constructed from bolted 0.060" thick fiberglass and is epoxied onto the terminal plate around bushing to form a second annulus with the porcelain bushing wall above the first annulus and the solder joint. After the epoxy has dried to secure the connection of the ring, mica dust is added to the first annulus and second annulus to 3/4" above the solder joint. The next 40% of the annulus on top of the mica dust is filled with silicone grease. The final 20% of the second annulus is filled with silicone oil.

The method provides a field repair of the leaks until a down time can be scheduled for a permanent repair.

While preferred embodiments of the invention have been described, the present invention is capable of variation and modification and therefore should not be limited to the precise details of the Examples. The invention includes changes and alterations that fall within the purview of the following claims.

What is claimed is:

1. A turbine generator with stator windings and a hydrogen pressured stator frame, comprising:
    an annular L-shaped collar affixed across a circumference of the stator frame and soldered thereto by a solder joint;
    a terminal plate anchored to the collar across the circumference of the stator frame and marginally separated from the collar to form a first annulus that contains a first sealant composition that interfaces with the solder joint; and
    a hardening sealant applied to an upper portion of the solder joint.

2. The turbine generator of claim 1, wherein the solder joint is ground out to form a recess to anchor the hardening sealant to the solder joint.

3. The turbine generator of claim 1, further comprising a second collar forming a second annulus above the surface of the first sealant composition to provide a second annular cavity to contain a second sealant composition applied coextensively over the first sealant composition and the hardening sealant to prevent escape of hydrogen from within the frame at the solder joint sealant composition interface.

4. The turbine generator of claim 1, wherein the first sealant composition comprises a filler powder compacted into the first annulus with a grease binder and a covering filler fluid.

5. The turbine generator of claim 1, wherein the first sealant composition comprises mica dust compacted into the first annulus with silicone grease covered with silicone oil.

6. The turbine generator of claim 1, further comprising a second collar forming a second annulus above the surface of the first sealant composition to provide a second annular cavity to contain a second sealant composition applied coextensively over the first sealant composition and the hardening sealant to prevent escape of hydrogen from within the frame at the solder joint sealant composition interface, wherein the second sealant composition comprises a filler powder compacted into the first annulus with a grease binder and a covering filler fluid.

7. The turbine generator of claim 1, further comprising a second collar forming a second annulus above the surface of the first sealant composition to provide a second annular cavity to contain a second sealant composition applied coextensively over the first sealant composition and the hardening sealant to prevent escape of hydrogen from within the frame at the solder joint sealant composition interface, wherein the second sealant composition comprises mica dust compacted into the first annulus with silicone grease covered with silicone oil.

8. The turbine generator of claim 1, wherein the hardening sealant comprises an epoxy.

9. The turbine generator of claim 1, wherein the hardening sealant comprises an applied two part composition.

10. The turbine generator of claim 1, further comprising a second collar forming a second annulus above the surface of the first sealant composition to provide a second annular cavity to contain a second sealant composition applied coextensively over the first sealant composition and the hardening sealant to prevent escape of hydrogen from within the frame at the solder joint sealant composition interface, wherein the second sealant composition comprises mica dust compacted into the first annulus with silicone grease covered with silicone oil and the hardening sealant comprises an epoxy.

11. The turbine generator of claim 1 further comprising a second collar forming a second annulus above the surface of the first sealant composition to provide a second annular cavity to contain a second sealant composition applied coextensively over the first sealant composition and the hardening sealant to prevent escape of hydrogen from within the frame at the solder joint sealant composition interface, wherein the first sealant composition comprises mica dust compacted into the first annul us with silicone grease covered with silicone oil, the second sealant composition is the same as the first sealant composition and the hardening sealant comprises an epoxy.

12. A hydrogen pressured stator frame, comprising:
    an annular L-shaped collar affixed across a circumference of the stator frame and soldered thereto by a solder joint;
    a terminal plate anchored to the collar across the circumference of the stator frame and marginally separated from the collar to form a firs: annulus that contains a first sealant composition that interfaces with the solder joint; and
    a hardening sealant applied to an upper portion of the solder joint.

13. The frame of claim 12, wherein solder joint is ground out to form a recess to anchor the hardening sealant to the solder joint.

14. The frame of claim 12, further comprising a second collar forming a second annulus above the surface of the first sealant composition to provide a second annular cavity to contain a second sealant composition applied coextensively over the first sealant composition and the hardening sealant to prevent escape of hydrogen from within the frame at the solder joint sealant composition interface.

15. The frame of claim 12, wherein the first sealant composition comprises a filler powder compacted into the first annulus with a grease binder and a covering filler fluid.

16. The frame of claim 12, wherein the first sealant composition comprises mica dust compacted into the first annulus with silicone grease covered with silicone oil.

17. The frame of claim 12, further comprising a second collar forming a second annulus above the surface of the first sealant composition to provide a second annular cavity to contain a second sealant composition applied coextensively over the first sealant composition and the hardening sealant to prevent escape of hydrogen from within the frame at the solder joint sealant composition interface, wherein the second sealant composition comprises a filler powder compacted into the first annulus with a grease binder and a covering fuller fluid.

18. The frame of claim 12, further comprising a second collar forming a second annulus above the surface of the first sealant composition to provide a second annular cavity to contain a second sealant composition applied coextensively over the first sealant composition and the hardening sealant to prevent escape of hydrogen from within the frame at the solder joint sealant composition interface, wherein the second sealant composition comprises mica dust compacted into the first annulus with silicone grease covered with silicone oil.

19. The frame of claim 12, wherein the hardening sealant comprises an epoxy.

20. The frame of claim 12, further comprising a second collar forming a second annulus above the surface of the first sealant composition to provide a second annular cavity to contain a second sealant composition applied coextensively over the first sealant composition and the hardening sealant to prevent escape of hydrogen from within the frame at the solder joint sealant composition interface, wherein the second sealant composition comprises mica dust compacted into the first annulus with silicone grease covered with silicone oil and the hardening sealant comprises an epoxy.

21. The frame of claim 12, further comprising a second collar forming a second annulus above the surface of the first sealant composition to provide a second annular cavity to contain a second sealant composition applied coextensively over the first sealant composition and the hardening sealant to prevent escape of hydrogen from within the frame at the solder joint sealant composition interface, wherein the first sealant composition comprises mica dust compacted into the first annulus with silicone grease covered with silicone oil, the second sealant composition is the same as the first sealant composition and the hardening sealant comprises an epoxy.

22. A method to seal a leak from a hydrogen pressured stator frame of a high voltage turbine generator comprising:

filling a first annulus formed between an annular L-shaped collar affixed across a circumference of the stator frame and soldered thereto by a solder joint and a terminal plate anchored to the collar across the circumference of the stator frame with a first sealant composition;

applying a hardening sealant onto the solder joint; and coextensively covering the first sealant composition and the applied hardening sealant with a second sealant composition.

23. The method of claim 22, comprising forming a recess in the solder joint to anchor the hardening sealant.

24. The method of claim 22, wherein the first sealant composition comprises mica dust compacted into the first annulus with silicone grease covered with silicone oil, the second sealant composition is the same as the first sealant composition and the hardening sealant comprises an epoxy.

* * * * *